No. 893,852. PATENTED JULY 21, 1908.
J. G. LEYNER.
AIR VALVE FOR AIR COMPRESSORS.
APPLICATION FILED MAY 28, 1906.
2 SHEETS—SHEET 1.
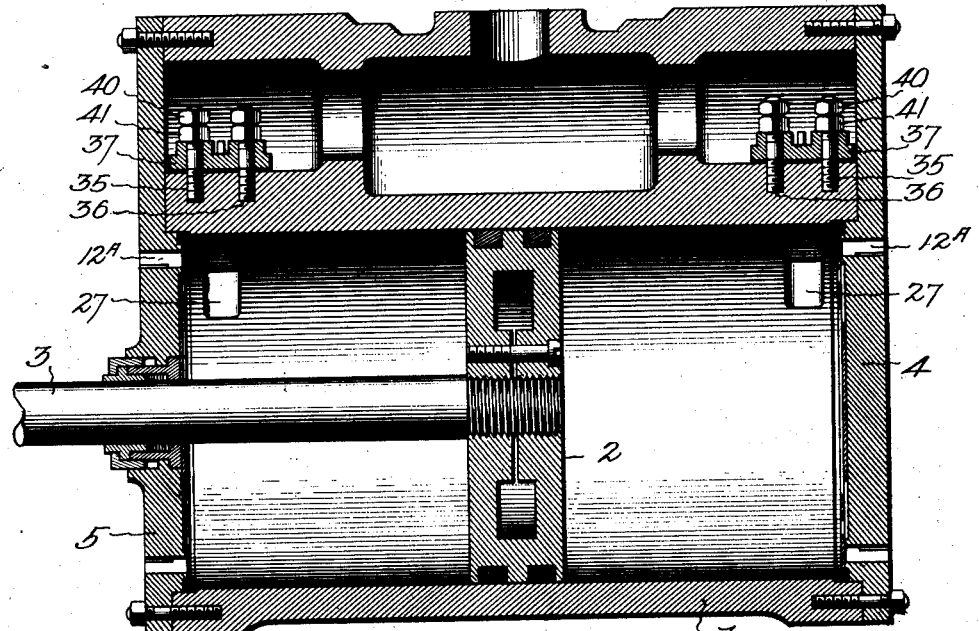
Fig. 1.
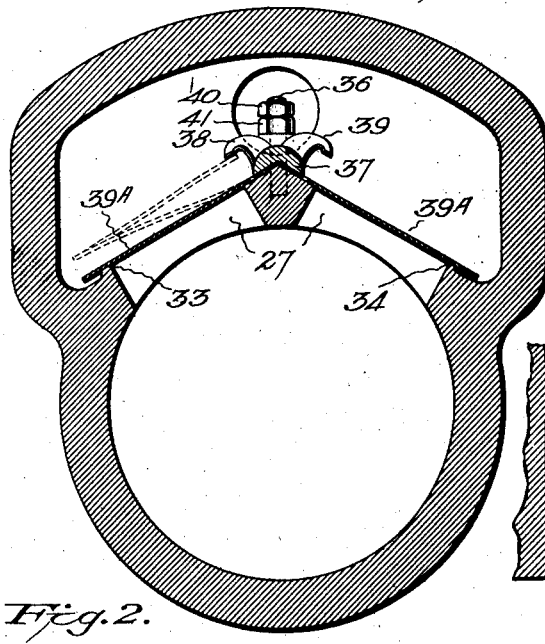
Fig. 2.
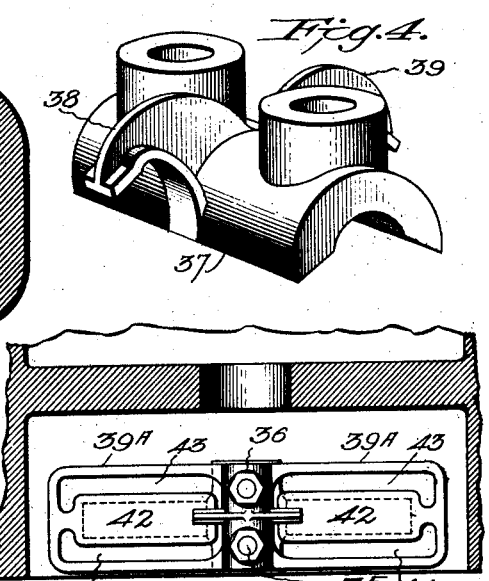
Fig. 4.
Fig. 3.
Witnesses:
G. Sargent Elliott
Adella M. Fowle
Inventor:
John George Leyner
By H. S. Bailey. Attorney.

No. 893,852. PATENTED JULY 21, 1908.
J. G. LEYNER.
AIR VALVE FOR AIR COMPRESSORS.
APPLICATION FILED MAY 28, 1906.
2 SHEETS—SHEET 2.
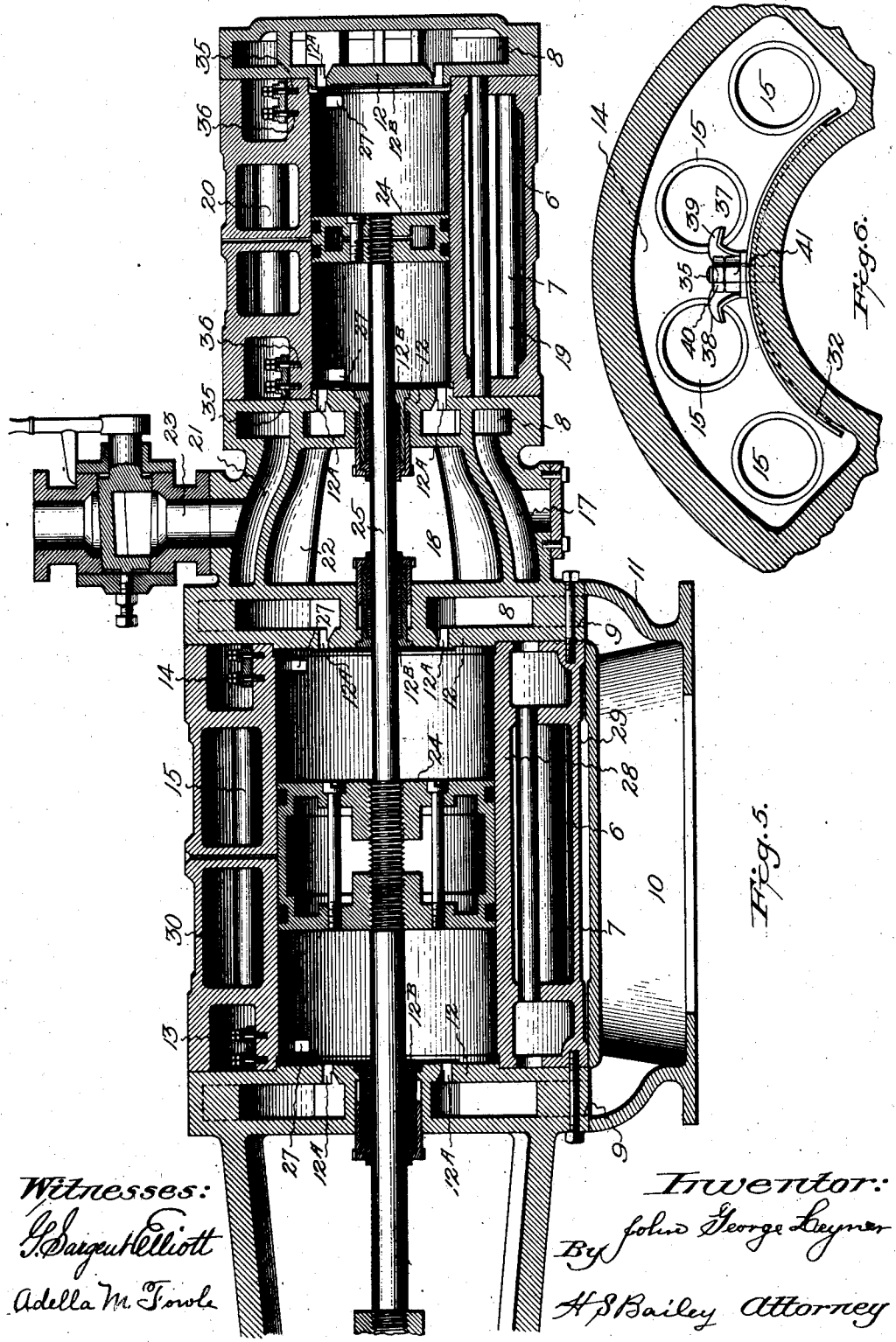

UNITED STATES PATENT OFFICE.

JOHN GEORGE LEYNER, OF DENVER, COLORADO.

AIR-VALVE FOR AIR-COMPRESSORS.

No. 893,852.

Specification of Letters Patent.

Patented July 21, 1908.

Application filed May 28, 1906. Serial No. 319,138.

*To all whom it may concern:*

Be it known that I, JOHN GEORGE LEY-NER, a citizen of the United States of America, residing in the city and county of Denver and State of Colorado, have invented a new and useful Air-Valve for Air-Compressors, of which the following is a specification.

My invention relates to improvements in air valves, and especially to air outlet valves for air compressors, and the object of my invention is: to provide an elastic sensitive valve that will seat quickly and evenly. I attain this object by the mechanism illustrated in the accompanying drawings, in which:

Figure 1, is a vertical, longitudinal, sectional view of an air compressing cylinder, showing the manner of securing the improved air outlet valve above the outlet ports at the ends of the cylinder. Fig. 2, is a vertical, transverse, sectional view through one end of the cylinder, showing the outlet ports, the valves seated thereon, and the manner of clamping the valves in position. Fig. 3, is a horizontal sectional view of a portion of the end of the cylinder, showing a pair of valves in plan view. Fig. 4, is a perspective view of one of the clamping blocks by which the valves are clamped to the cylinder, the said blocks being provided with stop arms, which limit the upward movement of the valves. Fig. 5, is a vertical, longitudinal, sectional view of a compound, intercooling air compressor equipped with my improved valve. And Fig. 6, is a sectional view through a portion of one end of one of the cylinders shown in Fig. 5, showing a modification of the outlet valve applied thereto.

Similar letters of reference refer to similar parts throughout the several views.

Referring to the drawings, the numeral 1, designates an air compressing cylinder, which is not of the water jacketed type, although if desired my improved valve may be used on any type of air compressing cylinder.
2, designates a piston head, and 3, a piston rod reciprocally mounted in the cylinder; 4, is the front cylinder head; and 5, the rear cylinder head. These may be provided with any suitable type of air inlet valve, and if desired my new valve may be used as an air inlet valve. I have, however, designed my valve especially as an air outlet valve, and in Fig. 5, I have illustrated my improved disk valve operatively attached to an air intercooling compound air compressor, only the air compressing cylinders are shown, the steam driving cylinder being left off. In this type of compressor, the cylinders are provided with water jackets 6, which are provided with a series of air conducting tubes 7, that extend through it from end to end, and the cylinder heads are provided with air chambers 8, which connect by suitable passages 9, with an air inlet chamber 10, which is positioned in the supporting base plate 11, and which connects with the atmosphere. The inner wall 12, of each of the cylinder heads, is provided with a circular row of air inlet ports $12^A$, and an inlet valve $12^B$, is attached to the inner face of the hub of this inner wall, this valve being a disk valve, and a modification of the valve forming the subject matter of the present invention. The outlet valves are the same as those shown in Fig. 1, but the air passages are arranged differently, and as they do not form a part of my present invention, and as they are fully described in my pending application No. 123,539, filed October 1, 1902, for an improved air compressor, the following brief description of them is all that is necessary.

The air entering the chamber of the base plate flows into the air chambers of both the front and rear cylinder heads of the largest or low pressure cylinder, and is drawn into the cylinder through the circular row of port holes in the inner wall of these cylinder heads through the disk valve into the cylinder at each stroke of the cylinder, and is compressed and forced out of the cylinder through the outlet valves into valve chambers 13 and 14, from which it flows into tubes 15, and from them into an independent chamber formed in the rear cylinder heads, and then into the port 17, of the lower connecting piece 18, from which it flows into the front cylinder head of the high pressure cylinder, and through the tubes 19 to the rear cylinder head of the high pressure cylinder, from which the piston draws it into the cylinder through the ports $12^A$ and disk valves $12^B$, in the inner walls of the cylinder heads, and the air is compressed there and forced out through the air outlet valves and through the cooling tubes 20 into the port 21, of the upper connecting piece 22, into the outlet pipe 23, which conveys it to a storage tank or to use.

The high and low cylinders are provided with pistons 24, and a piston rod 25 connects them together, and extends from the low pressure cylinder through its front head.

I preferably use two or more of my new air outlet valves at each end of the cylinder, and preferably position them at the upper side of the cylinder. I also preferably arrange the cylinder so that the air as it is compressed in the cylinder leaves it through ports 27, formed in the inner peripheral shell of the cylinder close to the cylinder heads, although if desired the air may be discharged through the cylinder heads through a set of outlet ports that are independent of the air inlet ports. I form the low pressure cylinder with two shells 28 and 29, arranging them at a short distance apart so as to form a chamber 30, between them, and the ends of this chamber are closed by walls 31, and the space between these two walls and the outer and inner shell of the cylinder forms the water space.

I preferably form two air outlet ports 27, through the inner wall of the cylinder into the valve chamber, and on the floor of the valve chamber around these ports I form a valve seat 32, which consists of a raised base, and as the inner and outer shells of the cylinder are circular, the seat may also be made to conform to the curvature of the inner shell, as illustrated, and to be extended around to form a seat around each port, as shown in Fig. 6, where the valve chamber is positioned at the top of the cylinder centrally on each side of its vertical center, and the valve seat also extends in a curve parallel with the peripheral curve of the inner shell of the cylinder. I preferably, however, make two independent flat seats 33 and 34, extending them from the central vertical line where they meet and form an apex, and from which point they extend in opposite directions in a perfectly straight level plane, to close to the opposite side walls of the valve chamber. The surfaces of these valve seats are finished smooth all over, and at the apex I thread one of the ends of two studs 35 and 36, at a short distance apart, and on the studs I place a clamping washer 37, which extends from one stud to the other, and beyond each far enough to cover the valve seats, which are made wide enough to receive ports of area enough for the capacity of the cylinder. The ports are made of rectangular form, with their largest diameter extending from the apex towards the opposite end of the valve seat, and in the center of the length of the washer I form two projecting stop lugs 38 and 39, which extend from opposite sides of the upper portion of the washer, and project a short distance parallel with the length of the valve and port, but the under-sides of these lugs are positioned at a short predetermined distance above the top of the valve, the distance being made sufficient to define and limit the opening movement of the valve. The valves 39<sup>A</sup> each consist of a thin flat plate of spring metal, which is made wide enough to cover the ports and valve seat; as both valves are alike a description of one will answer for both.

One end of the valve is extended under the adjacent side of the washer, and is clamped down rigidly against the valve seat, by the washer, and by nuts 40 and 41, that are threaded to the ends of the studs and that screw down against the washer. The clamping of the valve plate down against the valve seat causes it to lie flat and tight against the valve seat throughout its length, and evenly over the port, and in the center of the valve a tongue of metal 42 is freed from the body of the valve by two parallel slots 43 and 44, which are formed on opposite sides of the valve at a short distance from its edges, and extend to the clamped end of the valve, where they unite adjacent to the washer, and thus form the tongue 42. At the opposite end of the valve, the slots approach each other, and terminate far enough apart to leave a narrow neck of metal 45, between the tongue and the body of the valve at its outer end. The tongues are made a little wider than the port, and their side and end edges rest on the edges of the valve seat around the edges of the ports, while the remainder of the body of the valve rests on the remainder of the valve seat, and the free end of the tongue is positioned directly under the projecting ends of the stop lugs so that when the valve is lifted from its seat by the inflowing air, they will strike against the lugs, which thus defines the opening movement of the valve.

The air in the simple cylinder shown in Fig. 1, after it is forced into the valve chamber through the valve, flows into an air port and out of the outlet, which may be connected by a pipe to a suitable cooler or receiver, which I do not show, but in the water jacketed intercooler type of air compressor, as shown in Fig. 5, the air after entering the low pressure cylinder, is compressed at each stroke of the piston and passes out alternately at each end of the cylinder through the valves 39<sup>A</sup>, into the valve chambers 13 and 14, whence it traverses the length of the cylinder, through suitable groups of pipe, and then passes through the front cylinder head, and into the high pressure cylinder, where it is further compressed, in the same manner as in the low pressure cylinder, and passes out through the pipe 23, to a place of storage or to use.

The operation of my improved valve is as follows: At each reciprocative stroke of the piston, the air is drawn into the cylinders through my air inlet valves alternately from each end of the cylinder, and on each stroke of the piston the air is compressed and forced through the ports 27 against the tongues of the spring plate valves 39^A, which are lifted from the valve seats by the air pressure against their under sides, and they rise in a substantially level plane, but the valve from its fixed edge under the clamping washer assumes a reverse curve, as shown, while the tongue itself rises and remains straight and substantially parallel to the surface of the valve seat, and it rises until its free end strikes the stop, which is positioned to allow the tongue to lift far enough to open the port to its full capacity without straining the resilient tension of the spring valve plate. The instant the piston has completed its stroke and started back, the valve closes by its own inherent resilient tension, the tongue moving down in a horizontal plane and resting with a strong but sensitive pressure evenly against its port seat, and the body springing flat down also against the valve seat. The curved form of spring plate valve operates in a similar manner except that its tongue maintains a slight curved form that registers with the curvature of the valve seat.

My improvement is very simple, durable, and is sensitive and positive in its action.

Having described my invention, what I claim as new and desire to secure by Letters Patent, is:

1. In an air compressor, a valve of resilient sheet-metal cut to provide an integral inner tongue having a free end, and lateral spring members, said lateral spring members secured to the valve-seat adjacent the free end of said tongue.

2. In an air compressor, a valve of resilient sheet-metal cut to provide an integral inner tongue having a free end, lateral spring members, said lateral spring members secured to the valve-seat adjacent the free end of said tongue, and a stop limiting the movement of the free end of said tongue.

3. In an air compressor, a valve of resilient sheet-metal cut to provide an integral inner tongue having a free end and a relatively narrow attaching neck, and lateral spring members, said lateral spring members secured to the valve-seat adjacent the free end of said tongue.

4. In an air compressor, adjacent valve ports, valves therefor each comprising a resilient sheet-metal valve body cut to provide an integral inner tongue having a free end, and lateral spring members, and common securing means for said lateral spring members located between said ports.

5. In an air valve for air compressors, the combination with the cylinder and the piston, of a water jacketed air compressing cylinder, having a double shell and a valve chamber at each end, of cylinder heads fitting the opposite ends of said cylinder, having air inlet ports and air inlet valves, air outlet ports at the opposite ends of said cylinder ports through the inner shell of said cylinder into said valve chambers, having a valve seat within said chambers, and a valve comprising thin plate of spring metal secured at its end to said valve seat and having a released tongue portion at its center portion, arranged to bear on said valve seat and arranged to be opened by the air compressed by the reciprocal strokes of said piston.

6. In an air valve for air compressors, the combination of the cylinder, the piston, and the piston rod, said cylinder being provided with valve chambers at its opposite ends, and air outlet ports extending from said cylinder into said ports, and valve seats in said chambers around said ports, a clamping washer bolted to said valve seat, air outlet valves secured at one end by said clamping washer to said valve seat and arranged to fit said valve seat, said valves consisting of thin plates of spring metal provided with resilient tongue portions freed from its body portion in such a manner as to permit its body portion to resiliently move with said tongues independent of that portion of said valve that is secured by said washer, said valves being adapted to be operated by the reciprocal strokes of said piston.

7. In an air outlet valve, the combination with the cylinder having a double shell, containing a water jacket, and air tubes extending through said water jacket, the piston, of the cylinder heads provided with air inlet ports, of valve chambers formed in the opposite ends of said cylinder connected to said air tubes, air outlet ports extending from said cylinder's bore through the inner shell of said cylinder into said chambers, said chambers being provided with valve seats around said ports, said ports being positioned in opposite directions from a common central point, a clamping washer removably secured by bolts to said central point, two valves arranged to be clamped at one of their ends to said valve seats by said washer and bolts, and adapted to extend in opposite directions from said washer, and to fit over said ports and valve seats, and having said valves provided with slots and with resilient freed tongue members arranged to permit said valve to be lifted from said ports by the air pressure strokes of said piston and to be closed by the inherent spring or resilient tension of said valve, together with and on the suction movement of said piston.

8. In an air outlet valve for air compressors, the combination of the water-jacketed intercooler compound cylinders and pistons, said cylinders having hollow cylinder heads, and air inlet valves, and provided with air outlet valve chambers at the opposite ends of said cylinders, and with air outlet ports extending from said cylinders' piston bores into said valve chambers, provided with valve seats in said cylinder, a thin spring-metal plate valve fitting each of said valve seats, and arranged to fit each of said valve ports, means for rigidly securing said valves in operative relation to said valve seats, and a pair of slots in the opposite sides of each of said plates connected together at one end of said valve plate, and arranged and adapted to free from the central portion of said valve plate a tongue portion, which is adapted to fit over its port and to rest on the surrounding edges of said port's seat, said tongue and slots being so arranged relative to each other and to the secured portion of said valve to permit said valve to raise by its resilient springing quality and be moved away from said valve seat by air pressure from said cylinder through said ports, and be so arranged that said tongue will move away from said seat in a plane practically parallel throughout its length to said valve seat, and be returned to said seat by the resilient tension of said valve, on the suction stroke of said piston, and means for defining the operative movement of said valve.

9. In an air inlet valve for air compressors, the combination with operative compound cylinder water-jacketed air-inter-cooler, air compressor, of a valve chamber in each end and air outlet ports leading into said chamber and having valve seats therein, and the pistons and piston rods in said cylinders, the valve operatively seated over said ports, the studs and their nuts threaded to said valve chambers, the washers mounted on said studs and arranged to clamp said valves to said port seats, said valves being provided with slots arranged and adapted to release a tongue portion that is arranged to seat over said ports on said port seats, and be actuated by the operative air compressing stroke of said piston, and its inherent resilient tension.

10. In an air inlet valve for air compressors, the combination of the cylinder, the cylinder heads provided with air inlet ports, and the piston and piston rod, with a valve chamber formed in each end of said cylinder, two air outlet ports extending from said cylinder into said valve chamber and having valve seats around said ports, stud bolts threaded centrally between said seats and ports, an oblong washer mounted on said bolts, a thin spring-plate valve fitted to fit each of said valve seats, having one end extending under said washer and clamped rigidly to said valve seats by said bolts and washer, and having the body of each of said valves slotted by a U-shaped slot arranged to release a resilient tongue portion in such a manner that its free end terminates adjacent to said washer, and that is arranged to fit the valve seats around the edges of said port, and to be opened and closed by the air pressure made by the reciprocal movement of said piston, and lugs projecting from the opposite sides of said washer and arranged in the path of the free end of said tongue, and adapted to limit its opening movement.

In testimony whereof I affix my signature in presence of two witnesses.

JOHN GEORGE LEYNER.

Witnesses:
  G. SARGENT ELLIOTT,
  BESSIE THOMPSON.